United States Patent [19]
Antonov

[11] Patent Number: 5,993,346
[45] Date of Patent: Nov. 30, 1999

[54] TRANSMISSION DEVICE PARTICULARLY FOR VEHICLES, AND CONTROLLED METHODS ASSOCIATED THEREWITH

[75] Inventor: Roumen Antonov, Paris, France

[73] Assignee: Antonov Automotive Technologies B.V., Rotterdam, Netherlands

[21] Appl. No.: 08/752,971

[22] Filed: Dec. 2, 1996

Related U.S. Application Data

[63] Continuation of application No. 08/505,303, Aug. 17, 1995, abandoned.

[30] Foreign Application Priority Data

Feb. 18, 1993 [FR] France ................................. 93 01841

[51] Int. Cl.⁶ .................................................. F16H 47/08
[52] U.S. Cl. ......................... 475/258; 475/254; 475/267; 74/336 R
[58] Field of Search ..................... 475/254, 259, 475/266, 258, 267, 288, 289, 293; 74/335, 336 R

[56] References Cited

U.S. PATENT DOCUMENTS

| | | | |
|---|---|---|---|
| 3,978,742 | 9/1976 | Abbott | 475/254 X |
| 5,011,464 | 4/1991 | White | 475/259 X |
| 5,033,598 | 7/1991 | Tipton | 192/70.24 |
| 5,069,087 | 12/1991 | Ishino et al. | 475/128 X |
| 5,087,233 | 2/1992 | Asada | 475/289 X |
| 5,088,968 | 2/1992 | Horii et al. | 475/128 X |
| 5,263,906 | 11/1993 | Antonov | 475/258 X |
| 5,311,795 | 5/1994 | Yoshimura et al. | 475/123 |
| 5,409,428 | 4/1995 | Antonov | 475/258 |
| 5,514,044 | 5/1996 | Antonov | 475/266 X |

FOREIGN PATENT DOCUMENTS

| | | |
|---|---|---|
| 1230 679 | 12/1996 | Germany . |
| 92/07206 | 4/1992 | WIPO . |
| 93/08411 | 4/1993 | WIPO . |

*Primary Examiner*—Dirk Wright
*Assistant Examiner*—Peter T. Kwon
*Attorney, Agent, or Firm*—Kenyon & Kenyon

[57] ABSTRACT

The crown wheel of a planetary gear is connected to an input shaft while the planet carrier is connected to the output shaft. The sun wheel is locked by means of a free wheel when the clutch is released. The device then operates as a reduction gear. The sun wheel rotates with the crown wheel and the planer carrier when the clutch is engaged. The axial forces ($F_{AP}$, $F_{AC}$), sustained by the sun wheel and the crown wheel when in gear-reduction mode, and resulting from the helical tooth configuration, tend through the stop to compress a spring and release the clutch. When in direct drive and beyond a certain torque, the clutch slips, thereby generating the above-mentioned axial forces which compress the spring and accelerate disengaging. The device operates as a reduction gear until the torque on the shaft is reduced, thereby, enabling the spring to re-engage the clutch. For use on the input side of a gear box in order to automatically reduce speed ratios during acceleration, the gear box being itself preferably automatically controlled, especially under the effect of axial forces generated by other planetary gears.

23 Claims, 7 Drawing Sheets

FIG_2

FIG_9

FIG_3

FIG_4

TRANSMISSION DEVICE PARTICULARLY FOR VEHICLES, AND CONTROLLED METHODS ASSOCIATED THEREWITH

This application is a continuation of application Ser. No. 08/505,303, filed on Aug. 17, 1995 now abandoned.

FIELD OF THE INVENTION

The present invention concerns an automatic transmission device with at least two ratios, in particular for a vehicle.

The present invention also concerns methods for controlling such a transmission device.

RELATED TECHNOLOGY

Patent WO-A-9207206 makes known an automatic transmission system in which a clutch selectively connects two rotating organs of a differential gear, such as an epicyclic train, according to whether one or other of two opposing forces is dominant. This concerns, for example, an end thrust produced by helical teeth mounted axially mobile, tending to release the clutch in opposition to springs and/or a force produced by centrifugal tachometric means, tending to engage the clutch. When the clutch is released, a third rotating organ of the differential gear must be prevented from rotating and this may be achieved by a free wheel preventing the said third organ from turning in the opposite direction.

This type of transmission system is highly advantageous since its basic operation requires neither an external power source, sensors, nor a control circuit. The transmission device itself produces the forces that serve to control it and these forces are at the same time a measure of the parameters required for control.

However, such a transmission device is not directly capable of optimising hold-back operation, i.e. when the accelerator pedal is released so that the engine has a certain braking effect upon the vehicle. In this case, the resisting torque of the engine depends only on its speed of rotation and is not therefore indicative of the deceleration required by the driver. Moreover, if the torque is detected by a helical tooth reaction, this reaction changes direction during hold-back operation and therefore no longer tends to release the clutch. Furthermore, in the case of the construction using a free-wheel, even if the tooth reaction were capable of releasing the clutch thus creating one of the conditions of speed-reducing (reducer) operation, another condition would remain unsatisfied: during hold-back operation, the third rotary member of the differential gear tends to rotate not in reverse, but at high speed in the normal direction, which the free wheel cannot prevent.

Furthermore, WO-A-9113275 discloses a device which, while being of the same kind, makes no use of the tooth reaction. First means are provided for applying to the tachometric means a supplemental stress modifying the speed threshold for which the transmission ratio changes. Second means are provided for immobilising the third rotatable member thereby to cause hold-back operation with the shortest transmission ratio. Such arrangements require, however, a complicated control and practically do not allow optimised use of the braking effect of the engine.

SUMMARY OF THE INVENTION

The object of this invention is to provide a transmission device of the type in which the means of selective connection are controlled by variable opposing forces, but which also makes it possible to cause reducer operation in conditions apart from those defined by the opposing forces, especially when the vehicle's engine is running in hold back operation.

According to the invention, there is provided a device comprising a combination of rotating elements carrying intermeshing gears, a selective connection means, attacked by opposing means of stress producing forces of which at least one varies monotonically depending on at least one operating parameter of the transmission device, and a free wheel mounted for selectively activating one of the rotating elements when the selective connection means is in a disconnected state, the combination of rotating elements creating two different transmission ratios depending on whether the selective connection means is in the disconnected state or in a connected state, respectively, the device further comprising means of additional stress for selectively applying to the connecting means an additional force promoting a predetermined one of the connected and disconnected states of the selective connection means, and consequently promoting prevalence of the corresponding transmission ratio in the transmission device, and activation means for, independently of the free wheel, subjecting the rotating element associated with the free wheel to an activation state corresponding to the transmission ratio which is promoted by the additional stress, characterized in that the activation means are mechanically conjugated with the means of additional stress for completing said activation state when said means of additional stress maintains said selective connection means in said predetermined state.

The means of additional stress introduce into the transmission device a force which simulates an increase or reapparance of one of the opposing forces normally controlling the device, so as further to promote the operation of the device according to one of the transmission ratios with respect to the case of automatic control by the opposing means of stress alone. This action is automatically conjugated with a specific activation of the rotating element associated with the free wheel. This makes it possible, for example, to easily and safely cause operation of the device in its shortest ratio in any and all circumstances where this is desired and desirable especially when the engine delivers a negative torque.

Preferably, the combination of gears is a differential set of gears comprising several rotating elements with intermeshing teeth, and the selective connection means is a clutch mounted operatively between two said rotating elements to make the differential gear operate selectively according to a first and second transmission ratio, whilst a free wheel precludes reverse rotation of a rotating reaction element of the differential gear when the clutch enables relative rotation between its two elements. In this case, there is advantageously provided:

as said activation means, a means of immobilization for selectively blocking the rotating reaction element independently of the free wheel; and actuator means for simultaneously actuating the means of immobilization in the direction of blocking and the means of additional stress in the direction of clutch release.

Activating the actuator means, causes both release of the clutch and immobilization of the reaction member even when it tends to rotate in the normal direction. Thus the conditions required for the differential gear to operate as a reducer are achieved even if the input shaft of the device undergoes negative torque, i.e. a torque exerting itself in the opposite direction to the direction of rotation (holdback torque).

According to a second object of the invention, the method for controlling a transmission device according to the first object, in which the opposing means of stress include elastic means tending to connect the means of connection, is characterised in that to set an output shaft of the device in motion, the means of additional stress are activated to place the means of selective connection in an unconnected state in opposition to the elastic means so that setting in motion begins with the shortest transmission ratio.

Traditionally, a transmission ratio is said to be "short" or "low" when it corresponds to a low output speed as compared to the input speed. In the opposite case, the ratio is said to be "long" or "high".

According to a third object of the invention, the method for controlling a transmission device according to the first object is characterised in that when the torque applied to an input shaft of the device is in the opposite direction to the rotation of the said shaft, the means of additional stress are selectively activated to bring the combination of teeth into operation with its shortest transmission ratio.

According to a fourth object of the invention, the method for controlling a transmission device according to, the first object is characterised in that the means of additional stress are activated on detecting a strong demand for power by the vehicle's driver.

According to a fifth object of the invention, the method for controlling a transmission device according to the first object is characterised in that the means of additional stress are activated so that they apply to the means of selective connection a force which does not exceed that of centrifugal fly-weights tending to connect the means of connection unless the force of the fly-weights corresponds to a speed making it possible to pass from the longer to the shorter of the two transmission ratios without the risk of overspeed at the device's input.

BRIEF DESCRIPTION OF THE DRAWINGS

Other details and advantages of the invention will emerge more fully from the following description relating to non-limiting examples.

In the attached drawings.

DETAILED DESCRIPTION

Figure 1:
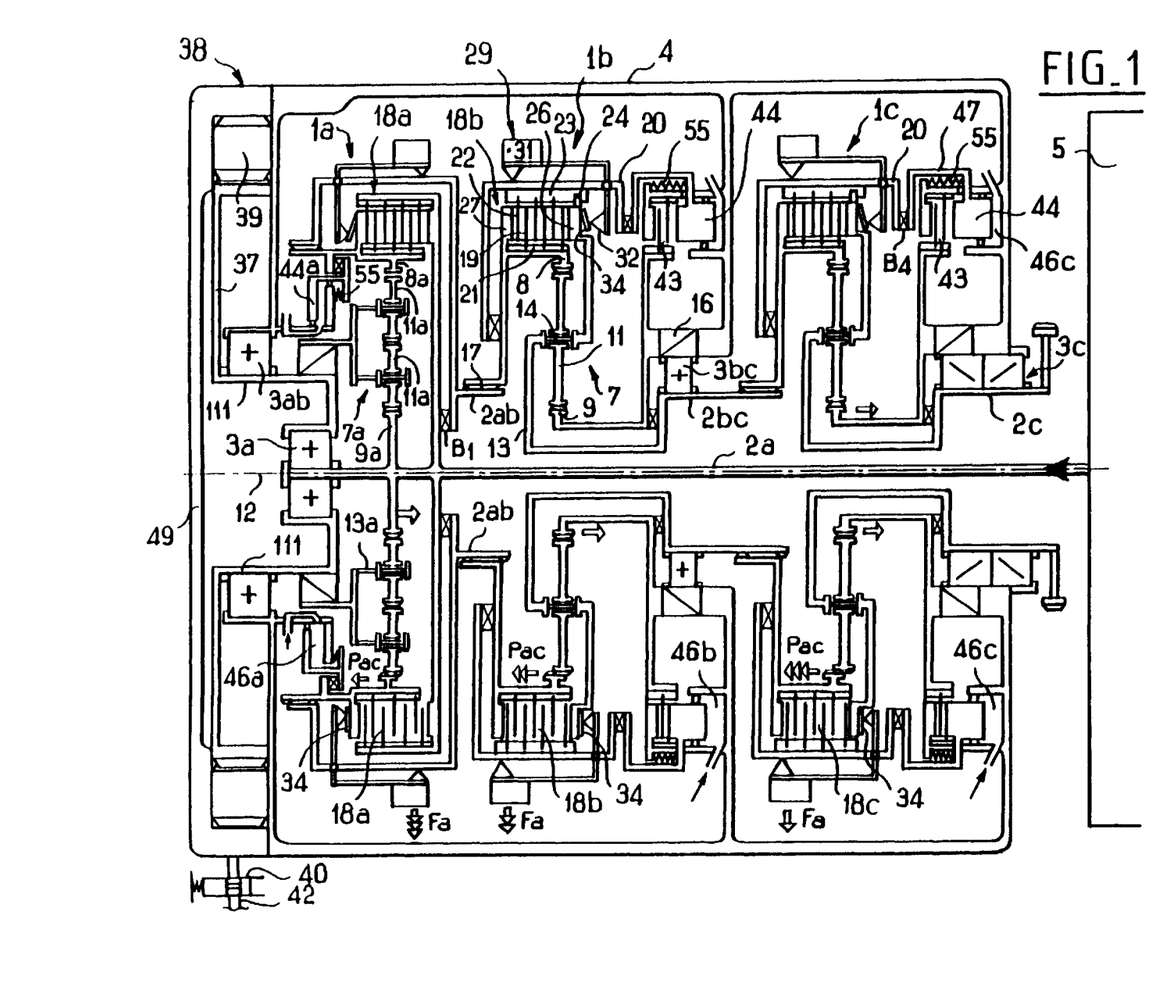
FIG. 1 is a diagrammatic longitudinal cross-section of a four-ratio transmission system comprising several successive transmission devices according to the invention, in rest position at the top of the Figure and in neutral position at the bottom of the Figure.

The four-ratio transmission system shown in FIG. 1, intended in particular for a motor-car, comprises three successive transmission devices (or modules) $1a$, $1b$ and $1c$, each with two ratios, mounted in series between an input shaft $2a$ and an output shaft $2c$ of the transmission system. Input shaft $2a$ also constitutes the input shaft in module $1a$. It is connected to the output shaft of an engine 5 of a vehicle without the intervention of a clutch. Output shaft $2c$ at the same time constitutes the output shaft of module $1c$ and comprises a toothed wheel designed to drive by meshing the input of a differential for driving the driving wheels of a vehicle. A manually-operated forward gear/reverse gear reverser may be interposed between the toothed wheel and differential input.

Input shaft $2a$ runs through the entire transmission system, the first module $1a$ being the furthest from the vehicle's engine. The third module $1c$ is the closest to the engine, so that the toothed output wheel is very close to the engine. Modules $1b$ and $1c$ are arranged around input shaft $2a$ without being connected in rotation to the latter. Along centre line 12 of the transmission system, between input shaft $2a$ and output shaft $2c$, there are two successive intermediate shafts $2ab$, $2bc$, which each constitute the output shaft of module $1a$, $1b$ respectively located upstream and the input shaft of module $1b$, $1c$ respectively located downstream. Input shaft $2a$, intermediate shafts $2ab$, $2bc$ and output shaft $2c$ are fixed axially in relation to transmission housing 4. For this reason, input shaft $2a$ is supported in rotation, and axially fixed, in a hub 111 by means of a bearing $3a$. Hub 111 is itself supported in rotation, and axially fixed, in relation to housing by a bearing $3ab$. Intermediate shaft $2ab$ is axially fixed by axially resting, with relative freedom of rotation, against input shaft $2a$ by means of an axial stop B1. Intermediate shaft $2bc$ and output shaft $2c$ are each supported by a roller bearing $3bc$, $3c$ relative to housing 4.

Each module is capable of reducer or direct-drive operation. A first ratio is achieved when the three modules work in reducer operation, a second ratio when the first module $1a$ works in direct-drive and the other two in reducer operation, a third ratio with the first two modules $1a$ and $1b$ in direct-drive and the third $1c$ in reducer operation, and a fourth ratio with the three modules in direct drive.

Figure 2:
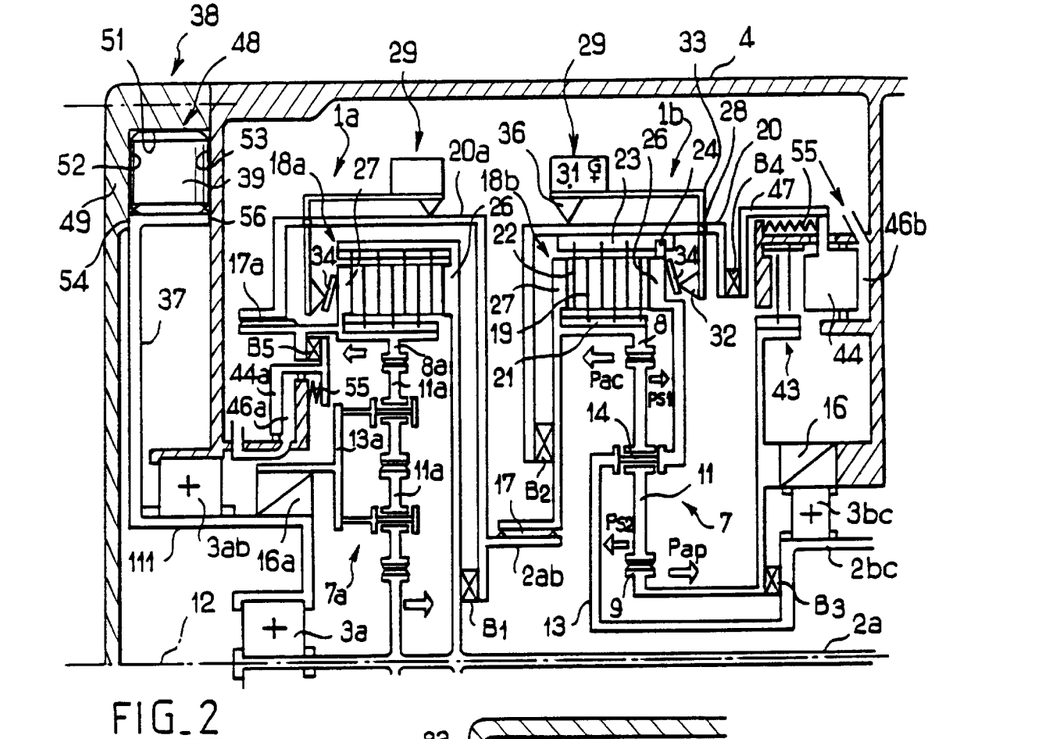
FIG. 2 is a large-scale view of the top left-hand part of FIG. 1.

There now follows a more detailed description of module $1b$, with reference to FIG. 2, this description being valid also for module $1c$ which is identical to module $1b$ except that its input shaft is shaft $2bc$ and that its output shaft is shaft $2c$ supported by bearing $3c$.

An epicyclic train 7 comprises a crown wheel 8 with internal teeth and a sun gear 9 with external teeth, both meshing with planet gears 11 supported, at equal angular intervals around centre line 12 of the transmission device, by a planet gear carrier 13 connected rigidly to output shaft $2bc$. Planet gears 11 can swivel freely around eccentric trunnions 14 of planet gear carrier 13. Sun gear 9 can turn freely around centre line 12 of the transmission device in relation to output shaft $2bc$ which it surrounds. However, a free-wheel device 16 prevents sun gear 9 from turning backwards, i.e. in the opposite direction to the normal direction of rotation of input shaft $2ab$, in relation to transmission housing 4.

Crown wheel 8 is connected in rotation, but free to slide axially in relation to input shaft $2ab$ of the module, by means of splines 17.

A clutch $18b$ is arranged around crown wheel 8. It comprises a stack of annular discs 19 alternating with anular discs 22. The discs 19 are connected in rotation to crown wheel 8 and can slide axially. For this purpose, discs 19 have internal teeth engaged in splines 21 integral with crown wheel 8. Discs 22 are connected in rotation, and can slide axially with respect to planet carrier 13. For this purpose, a cage has, on its radially internal face, splines 23 in which are engaged in an axially sliding manner on one side the external teeth of discs 22 and on the other side the external teeth 24 of planet gear carrier 13.

The stack of discs 19 and 22 may be squeezed axially between a retaining plate 26 integral with planet gear carrier 13 and a movable plate 27 which is integral with crown wheel 8. Plate 27 is therefore axially movable with crown wheel 8.

Cage 20 supports centrifugal fly-weights 29 arranged in a ring around clutch 18b.

The fly-weights are therefore connected in rotation to output shaft 2bc of module 1b to which they belong.

Each fly-weight has a solid body 31 located radially round the outside of discs 19 and 22 and an activator tip 32 resting against an external face of retaining plate 26 by way of a Belleville spring 34. Tip 32 is connected to solid body 31 by an angle arm 33 pivoting on cage 20 around a geometrical axis 28 positioned tangentially in relation to centre line 12 of the device. WO-A-91/13275 describes advantageous arrangements for the articulated mounting of such fly-weights. The centre of gravity G of the fly-weight is located inside or close to solid body 31, in a position which in relation to axis 28 is at a set distance measured parallel to centre line 12 of the device.

Figure 4:
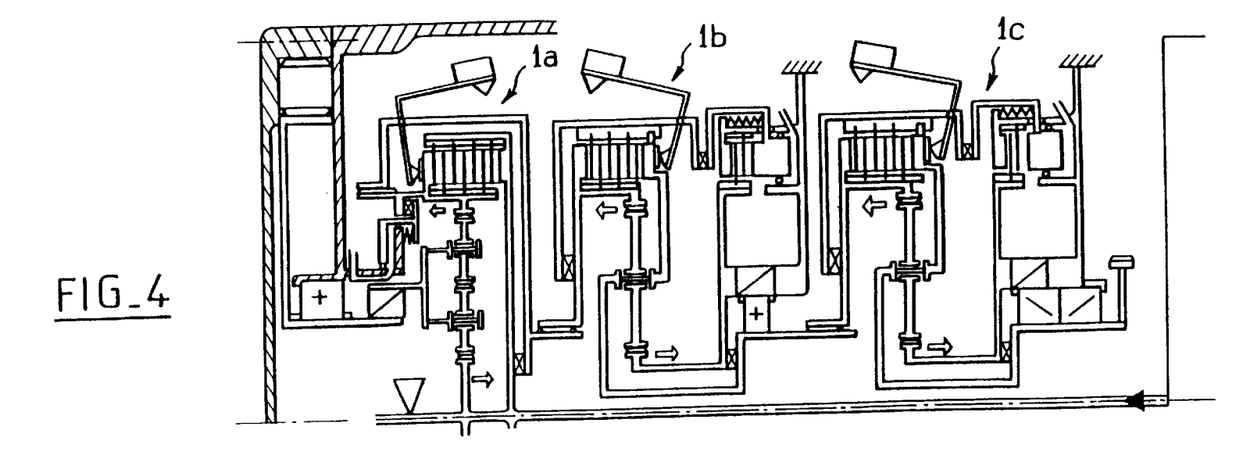

Thus, the rotation of planet gear carrier 13 tends to make the bodies 31 of fly-weights 29 pivot radially outwards around their tangential axis 28 under the influence of their centrifugal force Fa, causing them to move from a position of rest defined by a stop 36 against cage 20 to a distanced position, as shown in FIG. 4.

This then results in a relative axial displacement between tip 32 and fly-weight pivot axis 28 and therefore between tip 32 and cage 20. In relation to the direction of displacement corresponding to the centrifugal distancing of fly-weights 29, cage 20 is rested axially against crown wheel 8, with relative freedom of rotation, by an axial stop B2.

Thus, the displacement of cage 20 in relation to tip 32 causes a relative movement which draws together tip 32 and movable plate 27 of clutch 18b. This relative movement may correspond to a compression of Belleville spring 34 and/or to a movement of movable plate 27 towards fixed plate 26 in the direction of engagement of clutch 18b.

When the transmission system is at rest as shown at the top of FIG. 1 and in FIG. 2, Belleville spring 34 transmits to cage 20, by means of fly-weights 29 with their stop at rest, a force which engages clutch 18b so that input shaft 2ab of module 1b is connected in rotation with output shaft 2bc and the module assumes direct-drive operation capable of transmitting torque up to a set maximum defined by the holding force of the Belleville spring.

The teeth of crown wheel 8, planet gears 11 and sun gear 9 are helical. Thus, in each pair of teeth meshing under load, opposing end thrusts occur which are proportional to the circumferential force transmitted and therefore to the torque on input shaft 2ab and the torque on output shaft 2bc. The helical pitch angle of the teeth is selected so that the direction of end thrust Pac originating in crown wheel 8 when the latter transmits a torque is such that movable plate 27, drawn axially by crown wheel 8, moves away from clutch retaining plate 26. Planet gears 11, which mesh not only with crown wheel 8 but also with sun gear wheel 9, undergo two opposing axial reactions PS1 and PS2, which balance each other, and sun gear 9, taking into account its meshing with planet gears 11, undergoes an end thrust Pap which is equal in intensity and opposed in direction to end thrust Pac of crown wheel 8. Thrust Pap of sun gear 9 is transmitted to housing 4 through a stop B3, planet gear carrier 13 and bearing 3bc. Thus, end thrust Pac is exerted upon movable clutch plate 27 and with respect to housing 4, and therefore to clutch retaining plate 26, in the direction tending to release clutch 18b. This force, transmitted by stop B2 to cage 20, also tends to bring tip 32 of fly-weights 29 and retaining plate 26 closer together, and thus to keep fly-weights 29 in their at rest position and compress Belleville spring 34.

Figure 3:
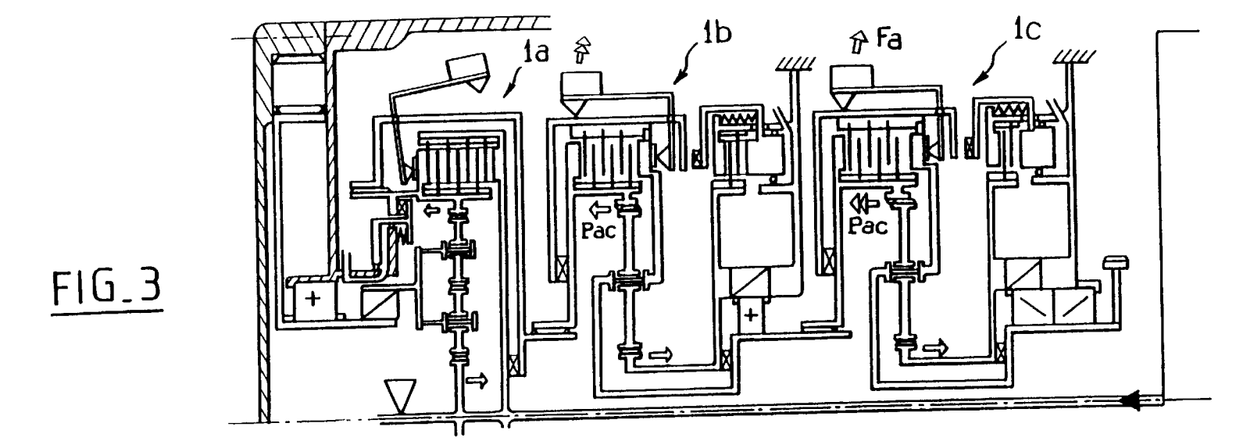
FIGS. 3 to 5 are views similar to the top half of FIG. 1, but relating to operation in 2nd Gear, 4th Gear, and hold-back in 3rd Gear respectively.

This is the situation represented in FIG. 3. Assuming that this situation has been reached, there now follows a description of the basic operation of module 1b. As long as the torque transmitted to the module by input shaft 2ab is such that end thrust Pac in crown wheel 8 is sufficient to compress Belleville spring 34 and keep fly-weights 29 in the at rest position shown in FIG. 3, the distance between retaining plate 26 and movable plate 27 of the clutch is such that discs 19 and 22 slide against each other without transmitting torque to each other. In this case, planet gear carrier 13 can rotate at a different speed to that of input shaft 2ab, and tends to be immobilised by the load which must be driven by the module's output shaft 2bc. Consequently, planet gears 11 tend to act as movement reversers, i.e. to make sun gear 9 turn in the opposite direction to the direction of rotation of crown wheel 8. But this is prevented by free wheel 16. Sun gear 9 is thus immobilised by free wheel 16 and planet gear carrier 13 turns at a speed which falls between the zero speed of sun gear 9 and the speed of crown wheel 8 and input shaft 2ab. The module thus works in reducer operation. If the speed of rotation increases and provided the torque remains unchanged, a point is reached where the centrifugal force produces a axial drawing-in force between retaining plate 26 and movable plate 27 greater than end thrust Pac, and movable plate 27 is pushed towards plate 26 to achieve direct drive.

When clutch 18b is engaged, the teeth of epicyclic train 7 no longer work, i.e. they no longer transmit any force and therefore do not generate any end thrust. Thus, the end thrust due to centrifugal force can exert itself fully so as to draw plates 26 and 27 together. This now enables a better understanding of the process of passing into direct drive: as soon as discs 19 and 22 begin to rub against each other and transmit part of the power, the teeth are discharged to the same extent, end thrust Pac decreases by the same amount and the supremacy of the centrifugal force becomes increasingly more dominant until clutch 18b fully enables direct drive.

It may well be that the speed of rotation of output shaft 2ab then decreases, and/or the torque to be transmitted increases, to the point that fly-weights 29 no longer provide a sufficient drawing-in force in clutch 18b to transmit the torque. In this case, clutch 18b starts to slip. The speed of sun gear 9 decreases until it reaches zero. free wheel 16 immobilises the sun gear and tooth force Pac will re-emerge to disengage the clutch so that the module will then work in reducer operation. Thus, each time that a change between reducer operation and direct drive operation occurs, axial force Pac changes to the direction that stabilises the newly-established transmission ratio. This is highly advantageous on the one hand to avoid incessant changes in ratio around certain critical points of operation, and on the other to ensure that the slipping of clutch 18b is only temporary.

Belleville spring 34 has a dual purpose. On the one hand, by drawing in the clutches when the transmission system is at rest, it achieves a mechanical connection between the input and output shafts of the module. Since this function is ensured in all three modules, when the vehicle is stationary it is held back by the engine when the latter has itself stopped. If clutch 18b were released when at rest, the vehicle would not be prevented from moving freely forwards since in this case the immobilization of crown wheel 8 by engine 5 would make sun gear 9 turn in the normal direction, unprevented by free wheel 16.

On the other hand, Belleville spring 34 enables the module to work in direct drive for relatively slow speeds where the centrifugal force, proportional to the square of the speed, would be so low that even a very small torque to be transmitted would cause, in a manner undesirable in practice, the maintenance of or a tendency to return to reducer operation.

The differences between module 1a as compared to module 1b are now described.

The use of an epicyclic train with the input on the crown wheel and the output on the planet gear carrier does not easily enable reduction ratios higher than 1.4:1 to be achieved. With such a ratio, the reduction in the speed of the engine when passing into 2nd gear would be 40%. This is a little low for passing from first to second gear. If the input is through the sun gear and the output through the planet gear carrier the reduction ratio is in practice at least 3, which is too high. By contrast, practically any reduction ratio can be achieved with the input through the sun gear and the output through the crown wheel, but in this case the crown wheel turns in the opposite direction to the sun gear, which is an inadmissible defect since the direcion of rotation of the crown wheel would not be the same when the module were working in direct drive operation and reducer operation.

In order to resolve all these difficulties at a stroke, module 1a has its input shaft 2a connected to sun gear 9a, its output shaft 2ab driven by crown wheel 8a, and in order that the direction of rotation of crown wheel 8a is the same as that of sun gear 9a even during reducer operation, each planet gear is replaced by a cascade of two planet gears 11a meshing together and one meshing with sun gear 9a and the other with crown wheel 8a. Planet gear carrier 13a is connected to hub 111 by free wheel 16a.

Hub III is integral with impeller 37 of starer brake 38.

Figure 6:
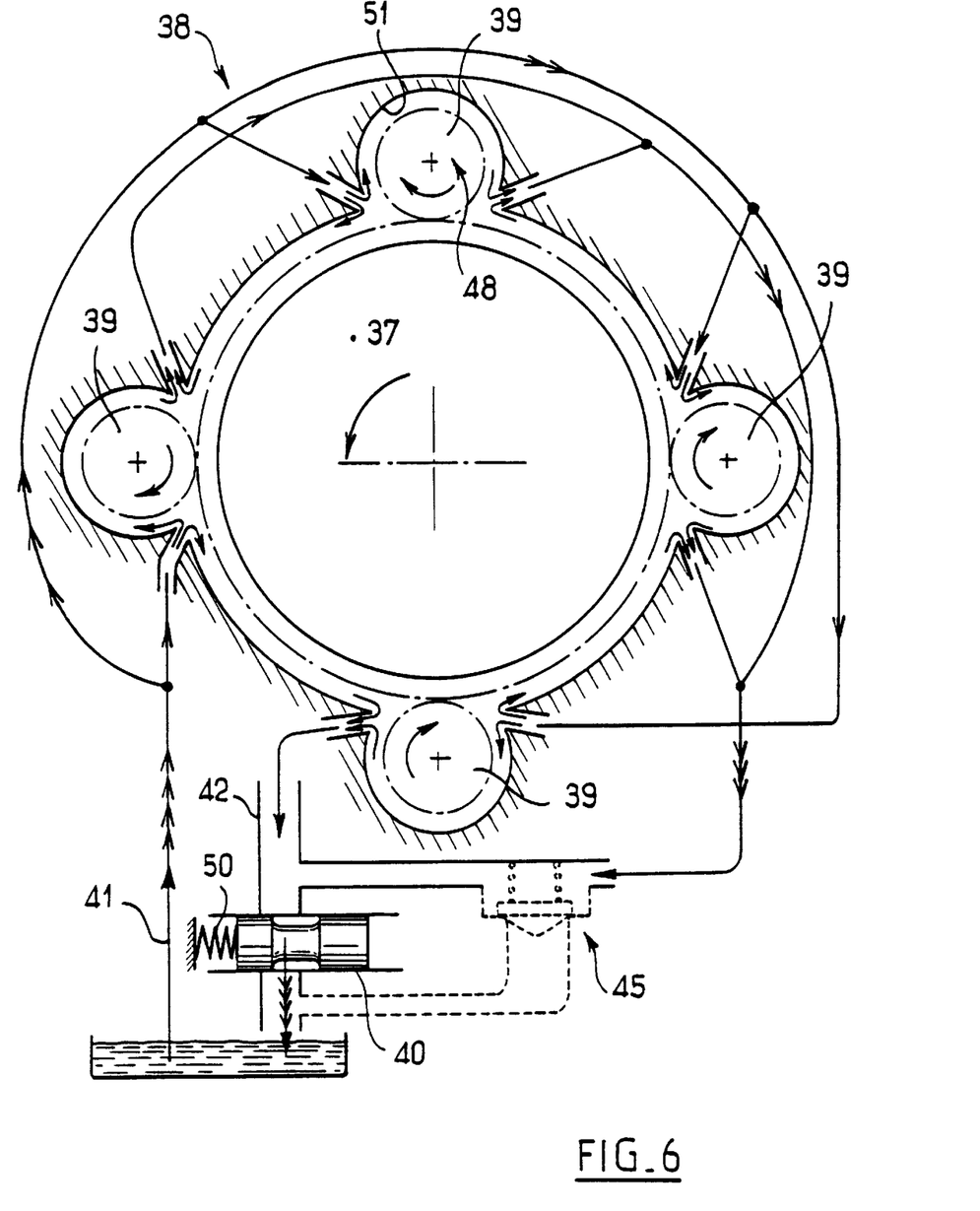
FIG. 6 is a diagrammatic front view of the starter pump shown in FIGS. 1 to 5.

As FIG. 6 also shows, brake 38 comprises a gear pump the impeller 37 of which comprises a driving sun gear driving four pumping planet gears 39 which are hydraulically in parallel with each other between a suction port 41 and delivery port 42 which can both be connected to a lubrication oil reservoir in the transmission system. A valve 40 is fitted in delivery pipe 42 so as selectively to enable or prevent the flow of oil through the pump, or even create a loss of head adjustable at the pump's outlet. When valve 40 is closed, the oil, prevented from flowing, stops the pump, so that impeller 37 can no longer turn and free wheel 16a enables planet gear carrier 13a to turn only in the normal direction. If, by contrast, valve 40 is open, impeller 37 turns freely. In this case, planet gear carrier 13a can turn in the opposite direction driving hub 111 with it by means of free wheel 16a, which causes pumping in the direction shown in FIG. 6. Valve 40 is caused to open so as automatically to achieve a neutral condition, i.e. to disconnect the input 2a and output 2c shafts when the vehicle is stationary (output shaft 2c immobile) whilst input shaft 2a is turning. It is due to this function that the clutch or torque converter usually mounted between engine 5 and the transmission system can be done away with. In order to cause the gradual setting in motion of output shaft 2c, valve 40 is gradually closed so as gradually to stop impeller 37 by means of an increasing loss of head through valve 40.

A variant would be to mount in parallel with valve 40 a non-return valve 45 enabling the oil to circumvent valve 40 if it tends to flow in the opposite direction to that shown in FIG. 6, i.e. if the oil tends to be taken in through delivery port 42, and discharged through suction port 41. Due to this non-return valve 45, free wheel 16a can be done away with, the free wheel's function being performed hydraulically by non-return valve 45. This solution avoids the need for the non negligible space occupied by a free wheel, but introduces a loss by hydraulic friction when module 1a is working in direct drive, a situation in which planet gear carrier 13a turns in the normal direction at the same speed as input shaft 2a.

As FIG. 2 also shows, the hydraulic pump forming part of brake 38 is made in a particularly simple way: each planet gear 39 is simply enclosed in a cavity 48 of a cover 49 fixed against the end of housing 4 opposite engine 5. The peripheral surface 51 of the cavities is in oil-tight contact with the tips of the teeth of planet gears 39 and the base surface 52 of cavities 48 as well as the outer end face 53 of housing 4 are in oil-tight contact with the two radial faces of each planet gear 39. Furthermore, impeller 37 has, on both sides of its teeth, two opposing annular faces 54 and 56 one of which is in oil-tight contact with the inner base of cover 49 and the other with outer face 53 of housing 4. The various oil-tight contacts of the tips of the planet gear teeth and the radial faces of the planet gears with cover 49 and housing 4 also guide the planet gears on rotation.

Cage 20a for fly-weights 29 of module 1a is, as in the other modules 1b and 1c, integral in rotation with the module's output shaft 2ab, but is also integral with the latter axially. Cage 20a, and with it axes 28 and fly-weights 29, do not therefore have any axial mobility.

By contrast, tips 32 of fly-weights 29 no longer rest on retaining plate 26, but on movable plate 27 of clutch 18a, still by means of a Belleville spring 34. Movable plate 27 is, like in the other modules, integral with crown wheel 8a, which is axially mobile due to splines 17a in relation to cage 20a connected in rotation to output shaft 2ab. Retaining plate 26 is integral with input shaft 2a.

The operation of module 1a is similar to that of modules 1b and 1c. The fly-weights or Belleville spring 34 tend to draw in clutch 18a with a force which determines the maximum transmittable torque, and during reducer operation the axial force of the helical teeth of crown wheel 8a pushes movable plate 27 in the clutch release direction.

There now follows an explanation of the general operation of the three modules 1a, 1b and 1c.

Taking the case where all the modules 1a–1c are working in reducer operation (bottom part of FIG. 1), whereby the first ratio of the transmission device is achieved, the speed is highest and torque lowest in module 1a, as illustrated by a triple arrow Fa and a single arrow Pac. This first module 1a is therefore the first to pass into direct drive operation when the vehicle accelerates, as shown in FIG. 3. The torque decreases in the second module 1b, since it is no longer increased by the gearing down in the first module, but the speeds of rotation in the second module remain unchanged and therefore lower than those in the first module just before the change, since they are caused by the speed of rotation of the vehicle's wheels. It is therefore necessary for the vehicle's speed to increase further before the second module can in its turn reach the conditions for passing into direct drive if the torque delivered by the engine remains unchanged; and so on until all the modules of the transmission device are in direct drive as shown in FIG. 4. Thus, the modules, all essentially identical, organise themselves spontaneously to achieve a stepped passage of speed ratios. The differences described concerning module 1a have no effect in this regard.

For ensuring that, among the modules which work in direct drive in a given situation, the one which shifts down is always the one which is closest operationally to output shaft 2c, there may be provided that the closer the modules are operationally to the output shaft the fewer, or lighter, their fly-weights, or the fewer the discs in their clutches. But it is a simple matter of introducing slight differences in the response to the torque transmitted, with variations of a few % in each module by comparison with the neighbouring one.

There now follows a description with reference to FIG. 2 and relating to module 1b of the additional means provided in modules 1b and 1c to make such modules work selectively in reducer operation in conditions different to those created by the axial forces of Belleville spring 34, centrifugal fly-weights 29 and the teeth of crown wheel 8.

For this purpose, module 1b has a brake 43 which enables sun gear 9 to be immobilised in relation to housing 4 independently of free wheel 16. In other words, brake 43 is mounted operationally in parallel with free wheel 16 between sun gear 9 and housing 4. A hydraulic piston 44 is mounted axially slidling selectively to apply and release brake 43. Brake 43 and piston 44 are ring-shaped having centre line 12 of the transmission system as their own centre line. Piston 44 is adjacent to a hydraulic chamber 46b which may be selectively supplied with oil under pressure to push piston 44 in the direction of applying brake 43, in opposition to the action of a return spring 55.

Moreover, piston 44 is connected rigidly to a pusher 47 which can rest against cage 20 by means of an axial stop B4. The assembly is such that when the pressure in chamber 46b pushes piston 44 into the position of applying brake 43, cage 20, before brake 43 is applied, is pushed sufficiently for clutch 18b to be released.

Thus, when piston 44 is in the position of applying the brake, sun gear 9 is immobilised even if planet gear carrier 13 tends to turn faster than crown wheel 8, as is the case in hold-back operation, and consequently the module works in reducer operation, as it is enabled to do by clutch 18b being released.

Assembly 43, 44, 46b and 47 described above thus constitutes a means which can be made available to the vehicle's driver to make the module work in reducer operation when he wishes to increase the engine braking effect, for example when going downhill.

We saw above that the Belleville springs 34 place all the modules in direct drive when the vehicle is stationary. On moving off, the emergence of tooth forces Pac must therefore make all the modules pass into reducer operation so that on moving off the system is in the first ratio. This may create an unwelcome systematic juddering. To avoid this, the brake 43, piston 44 and pusher 47 assembly places module 1b in its "reducer" state when the motor is turning over but output shaft 2c has not yet been set in motion, so that the transmission system operates on its first transmission ratio right from the start of setting output shaft 2c in motion.

In order to supply hydraulic chamber 46b with a view to performing the functions just described, a hydraulic pressure may be used, chosen sufficiently high to overcome with certainty the axial force produced in the opposite direction by fly-weights 29, whatever the speed of rotation of the fly-weights around centre line 12.

But for safety reasons, one may equally chose to supply hydraulic chamber 46b only with a pressure limited to a value such that the axial force of piston 44 does not exceed the opposing force of fly-weights 29 unless the speed of rotation of the fly-weights is sufficiently low for the passage into reducer operation not to give rise to overspeed of engine 5.

Hydraulic chamber 46b may equally be supplied, if the driver requires livelier performance making for high speeds of rotation of input shaft 2a, with a constant moderated pressure which, on cage 20, produces a force which comes in deduction from the drawing in force produced by the fly-weights. Thus, the transmittable torque in direct drive for a given speed of rotation of the fly-weights is less, and the speed above which the transmission system working in reducer operation returns to direct drive for a given torque is higher.

Piston 44 can also be used to accelerate the transition between direct drive operation and reducer operation. When the driver requires the full power of the engine suddenly, this is detected and a surge of pressure, lasting for example for one or two seconds, is sent into chamber 46b. This surge instantly releases clutch 18b, so that reducer operation is immediately established. When there is no longer any pressure in chamber 46b, the module does not pass back into direct drive operation since reducer operation with a strong power to transmit has given rise to a strong tooth end thrust Pac which maintains reducer operation. In other words, as the tooth force varies systematically in the direction that stabilises the newly-established transmission ratio, it is enough merely to apply one surge of force in the direction of the desired change, then to leave the internal forces of the module again to govern the performance of the latter. Here too, it is possible to ensure that the surge of pressure cannot overcome the force of the fly-weights unless the speed of the output shaft is below a certain threshold.

Module 1c has a brake 43, a piston 44, a chamber 46c and a pusher 47 as well as a stop B4, identical to those of module 1b.

By contrast, module 1a is different. It does have a piston 44a adjacent to a hydraulic chamber 46a, but there is no brake like 43 in parallel with free wheel 16a, and moreover piston 44 acts through a stop B5 not on cage 20a which is axially immobile, but on crown wheel 8a and movable plate 27 of clutch 18a in the direction of releasing clutch 18a. The aim of this assembly is simply to enable clutch 18a to be released when the vehicle is stationary but shaft 2a is already rotating, as enabled if valve 40 is in the open position. Piston 44a may also be used to encourage reducer operation for so-called "racy" driving or to send a surge of pressure when the driver fully depresses the accelerator pedal as described above. By contrast, piston 44a cannot be used to achieve reducer operation when the engine is in hold-back operation. It has in fact been considered pointless in practice to create the possibility of hold-back operation on the transmission's first ratio.

We shall now return to FIGS. 1 and 3 to 5 with reference to the different conditions of the transmission system as a whole.

In FIG. 1, top part, the transmission system is at rest in direct drive operation since all the clutches 18a. 18b, 18c are engaged and starting brake 38 is blocked as valve 40 is held in the closed position by its return spring 50. Pistons 44 and 44a are pushed towards their inactive position by the action of return springs 55.

In the situation shown at the bottom of FIG. 1, valve 40 is shown in the open position so as to release impeller 37. Hydraulic chambers 46a, 46b, 46c are shown to be supplied so as to release clutches 18a, 18b and 18c and compressing the corresponding Belleville springs 34, as well as the return springs 55 of the pistons. This is the situation when engine 5 is, for example, idling, when output shaft 2c is immobile (vehicle stationary). Starting device 38 then enables input shaft 2a to turn without any rotation of output shaft 2ab of module 1a, and without any rotation in the other two modules 1b and 1c. Planet gear carrier 13a and hub 11 turn in the opposite direction to normal to enable this situation. In this stage, impeller 37 adds its inertia effect to that of the conventional fly-wheel of thermal engine 5. This is highly advantageous since the flywheel of a thermal engine is useful chiefly during idling to prevent the engine, not connected to an inertial load, from being unable to continue its rotation when one of the pistons of the thermal engine reaches the end of its gas compression stroke. By contrast, during normal operation, the flywheel of a traditional thermal engine hinders the vehicle's acceleration performance. With impeller 37 turning only when the vehicle is stationary, on the one hand the same idling stabilisation is achieved with a smaller flywheel on engine 5, and furthermore the inertia of impeller 37 disappears during normal operation since impeller 37 is then stopped.

To pass from neutral operation corresponding to the situation just described for the bottom of FIG. 1 to the operating situation as per the first transmission ratio, valve 40 is gradually closed to set output shaft 2ab of the first module gradually in rotary motion and this motion is transmitted by being reduced in speed in each module until output shaft 2c. As soon as the vehicle reaches a certain speed, five kilometers/hour for example, the pressure in hydraulic chambers 46a, 46b and 46c can be released to enable tooth forces Pac, centrifugal forces Fa and the elastic forces of springs 34 to play their role in the automatic control of the assembly, as described above.

Figure 5:
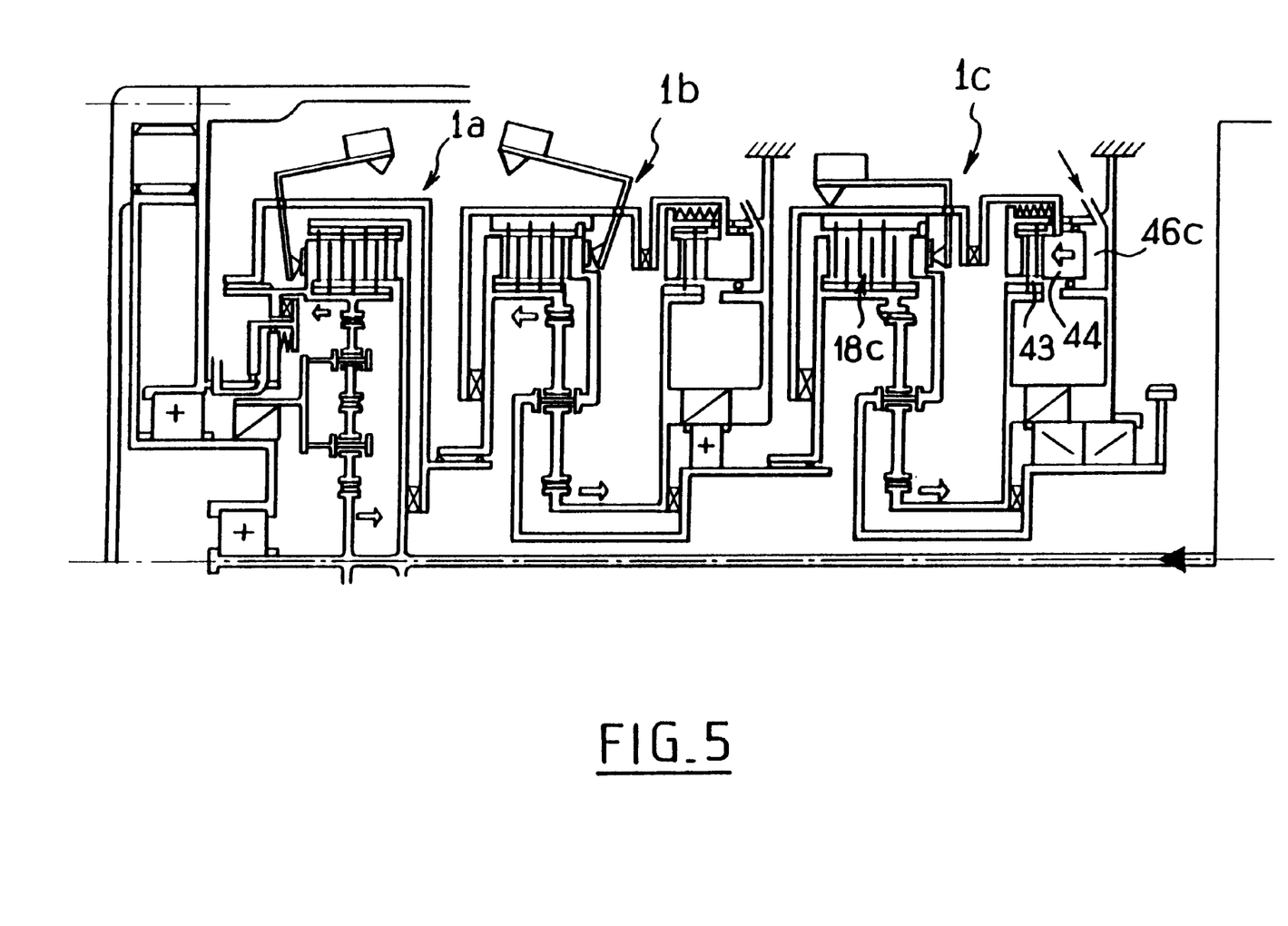

FIG. 5 shows that, from the direct drive situation of the transmission assembly, hydraulic chamber 46c of module 1c has been supplied in order to activate brake 43 and at the same time release clutch 18c of this module. Thus, piston 44 of this module forces the latter into reducer operation, either to create a greater engine braking effect or to initiate the return to reducer operation quickly for the purpose of sharp acceleration.

Figure 7:
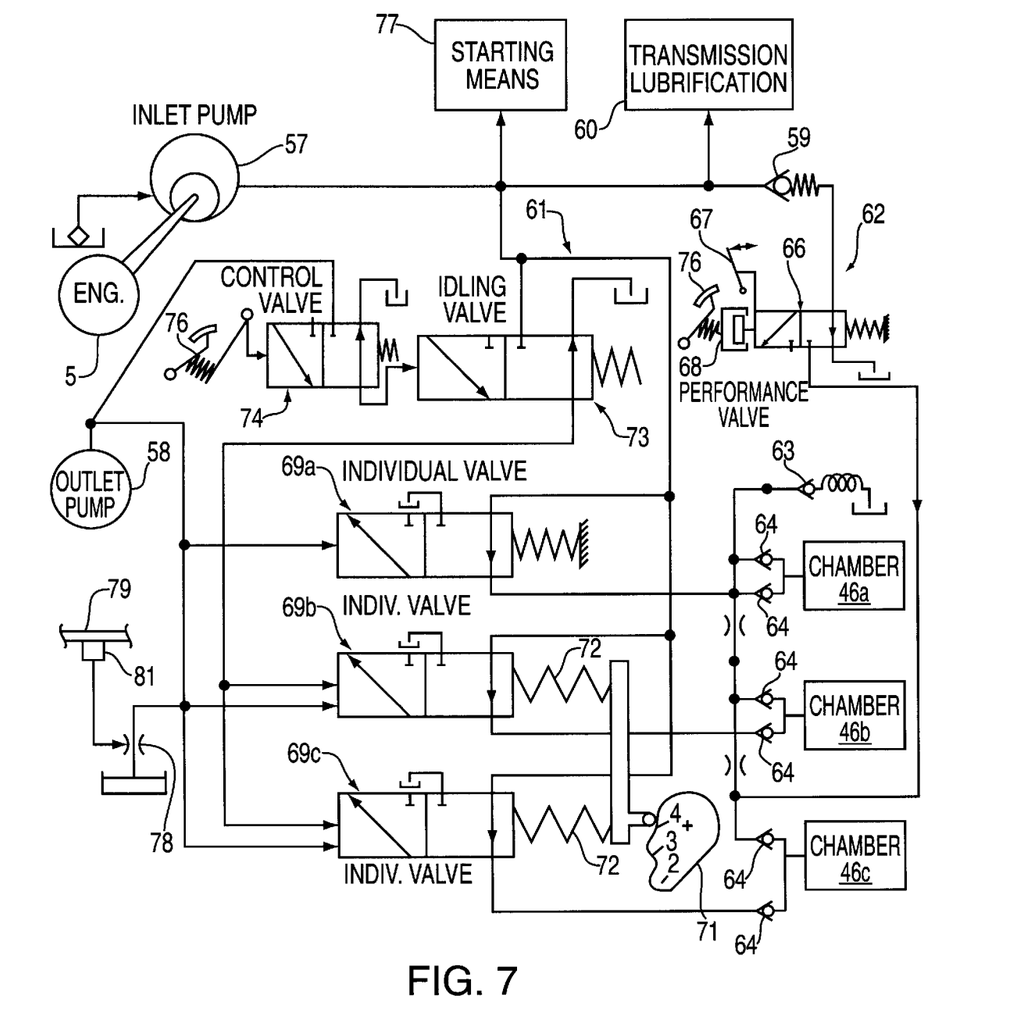
FIG. 7 is a hydraulics diagram for the transmission system shown in FIGS. 1 to 5.

We shall now describe, with reference to FIG. 7, an hydraulics diagram for controlling the hydraulic pressure in chambers 46a, 46b and 46c controlling pistons 44 and 44a.

In a manner not shown in FIGS. 1 to 5, at the transmission system input shaft there is a hydraulic inlet pump 57 driven by shaft 2a and therefore turning at the speed of engine 5, and at the transmission system output shaft or downstream of this output shaft is a hydraulic outlet pump 58. Pump 57 is designed to deliver a pressure which is constant whatever the speed of rotation of the engine, for example a pressure of 200 kPa maintained by a relief valve 59. By contrast, outlet pump 58 acts as a tachometric pump to deliver a pressure constituting a proportion of the transmission output shaft's speed, in other words a proportion of the vehicle's speed.

Upstream of relief valve 59, the inlet pump supplies a medium-pressure branch 61, which in particular can be connected to a transmission lubrication circuit 60. Downstream of valve 59, the inlet pump supplies a low-pressure branch 62, in which the pressure is fixed at 100 kPa, for example, by a terminal relief valve 63. Each hydraulic chamber 46a, 46b and 46c may be supplied by one or other of the two branches 61 and 62 by inlet valves 64 which systematically send the highest of the two pressures that they receive into the chamber associated to them, whilst preventing this pressure from passing into the other branch. The supply of low-pressure branch 62 is controlled by a performance valve 66 which, when it is in the open position, applies a pressure to chambers 46a, b and c which encourages the modules to work in reducer operation. This pressure may be applied either permanently when a manual control 67 is operated, or briefly, in surges lasting one or two seconds, by means of a damper 68 which is worked when the accelerator pedal is fully depressed.

The decision to send the medium pressure from branch 61 is made individually for each chamber 46a, 46b or 46c by an individual respective valve 69a, 69b or 69c. When valves 69a, 69b and 69c are at rest, the corresponding chambers 46a, 46b and 46c are supplied by the medium pressure, so that the corresponding modules work or are ready to work in reducer operation. The pressure of outlet pump 58 is applied to each individual valve to induce the latter to move to the closed position. For individual valve 69a, corresponding to the first module 1a, the valve moves into the closed position when the vehicle's speed is about 5 km/h.

The other two valves 69b and 69c move into the closed position when the vehicle's speed exceeds 30 and 50 km/h respectively and when a cam 71, able to move between the three positions marked "4", "3" and "2", is on position "4". When the cam, controlled by a manual selector, is on position "3", and even more so when it is on position "2", return springs 72 of individual valves 69b and 69c are further compressed to increase the return force back towards the open position, so that the speeds of the vehicle needed to make the individual valves move into the closed position are higher.

Furthermore, individual valves 69b and 69c selectively receive, in the direction of their passage into the closed position, and therefore in addition to the pressure corresponding to the vehicle's speed, the medium pressure of branch 61. This occurs if an idling valve 73, normally in the closed position, is pushed to the open position by the pressure of outlet pump 58. The pressure of pump 58 is applied to idling valve 73 when a control valve 74 is itself in the open position. Control valve 74 opens when the vehicle's accelerator pedal 76 is depressed.

There now follows a description of the operation of the hydraulic circuit shown in FIG. 7.

When the vehicle is stationary, accelerator pedal 76 released and the engine idling, control valve 74 is in the closed position and the pressure produced by outlet pump 58 is zero, so that the three chambers 46a, 46b and 46c are supplied and the three modules are ready to work in reducer operation.

The starting means 77, being able to draw their energy from medium-pressure circuit 61 of inlet pump 57, may be activated so as gradually to close valve 40 of starter brake 38.

When the vehicle's speed reaches about 5 km/h valve 69a closes so that chamber 46a is no longer under pressure (it is assumed at this stage that performance valve 66 is closed).

Furthermore, for the vehicle to be set in notion accelerator pedal 76 had had to have been operated, so that control valve 74 enabled the pressure accumulating in the delivery circuit of outlet pump 58 to push idling valve 73 into the open position. This enabled the medium pressure of branch 61 to push the other two individual valves 69b and 69c into the closed position to discharge chambers 46b and 46c.

In other words, as soon as the vehicle has started and so long as accelerator pedal 76 is operated, chambers 46a to 46c are without pressure and leave the forces produced by Belleville springs 34, fly-weights 29 and the helical teeth to handle the changes in ratio without outside influence.

At a certain vehicle speed, if the driver releases accelerator pedal 76, the idling valve closes and the position of individual valves 69b and 69c is governed by the pressure produced by outlet pump 58. This means that when the vehicle's speed falls below 50 km/h, the transmission initially in directe drive automatically shifts down into third gear, then into second gear when the speed passes the 30 km/h threshold in a downward direction.

These thresholds are increased when cam 71 is on position "3", and increased even further when the cam is on position "2". Thanks to cam 71, the vehicle's driver may produce an increased engine braking effect, for example when travelling downhill.

According to an improvement shown in FIG. 7, it is also possible for the thresholds to be increased when the driver applies the vehicle's brakes. For this purpose, outlet pump 58 delivers through an expansion valve 78 which is adjusted automatically so as to close all the more as the pressure in the hydraulic braking system 79 becomes greater. For this purpose, a pressure pick-up 81 mounted on the braking circuit, generates an electrical signal which operates valve 78. The more valve 78 is closed, the more the pressure in the delivery circuit of outlet pump 58 increases for a given vehicle speed.

If the driver operates accelerator 76 when the vehicle is stationary, the control valve opens but the pressure supplied by outlet pump 58 is zero, consequently the idling valve remains in the closed position.

Thus, the individual valves are only in the open position when the vehicle is stationary or when accelerator 76 is released and the vehicle speed is below certain thresholds.

When the individual valves are in the open position, their outlet is necessarily in communication with the corresponding chambers 46a, 46b and 46c. When they are in the closed position and performance valve 66 is in the open position, chambers 46a, 46b and 46c are supplied at low pressure as described above to modify the performance of the transmission system when accelerator pedal 76 is operated. FIG. 7 shows accelerator pedal 76 twice, near valves 66 and 74 respectively, but clearly there is in fact only one and the same pedal.

Figure 8:
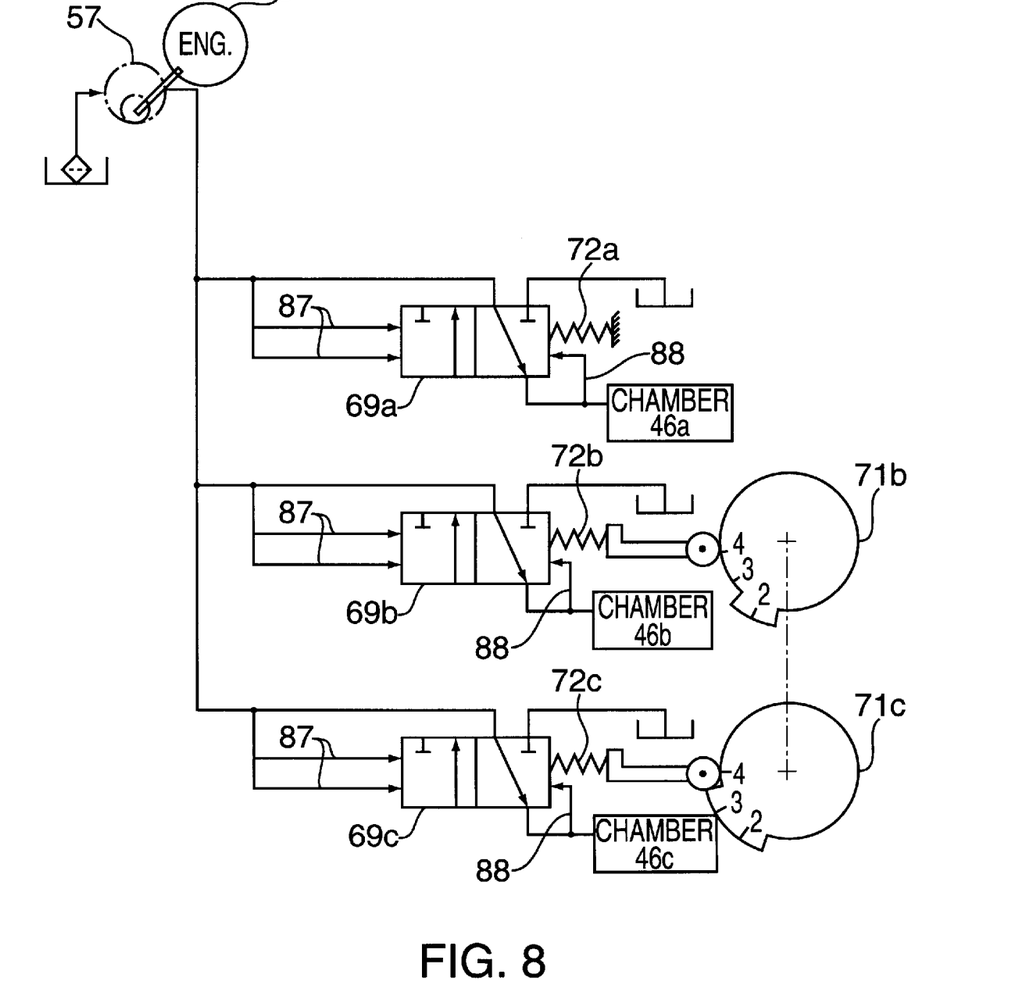
FIG. 8 relates to a hydraulics diagram variant for the transmission system shown in FIGS. 1 to 5.

The example shown in FIG. 8 corresponds to a simplified version which shall only be described as regards its differences in relation to FIG. 7.

There is no outlet pump, control valve or idling valve.

Inlet pump 57 serves as a tachometric pump to deliver a pressure which gradually increases up to, for example, 2,000 rpm, and which is then constant.

This pressure is only applied to the control inlets of the three individual valves 69a, 69b and 69c, over a relatively large area, as symbolised by double arrow 87. Furthermore, the pressure produced by pump 57 is applied to chambers 46a, 46b and 46c by individual valves 69a, 69b and 69c when the latter are kept in the open position by their return springs 72a, 72b and 72c, which increase in strength in this order.

When a chamber 46a, 46b or 46c is under pressure, a status stabiliser pipe or passage 88 applies the pressure of pump 57 over a relatively small area (single arrow), onto the side of the corresponding individual valve 69a, 69b or 69c so that this pressure acts in the same direction as spring 72a, 72b and 72c. Cam 71 is replaced by two cams 71b and 71c integral with each other. In position 3, cam 71c compresses spring 72c so that the elastic force overcomes the maximum force produced in the opposite direction by pump 57, and thus prevents direct drive operation. In addition, in position "2", cam 71b compresses spring 72b so as to prevent the system from passing into the 3rd transmission ratio.

When cams 71b and 71c are in position "4" and the engine is idling, the three individual valves 69a, 69b and 69c are open, so that the three modules work in reducer operation. As soon as the engine's speed of rotation reaches for example 1,400 revolutions per minute, valve 69a of the first module closes and allows passage into the second ratio, under the conditions defined by the tooth forces, Belleville springs 34 and centrifugal fly-weights 29. As soon as the engine's speed of rotation reaches 1,600 rpm then 1,800 rpm, individual valve 69b allows passage into the third ratio then, respectively, individual valve 69c in its turn allows passage into direct drive. Each time that a valve closes, status stabilisation pipe 88 is discharged, which stabilises the closing status.

When working in hold-back operation, starting from direct drive (4th ratio), as soon as the engine's speed of rotation falls below for example 1,300 rpm, a new threshold set by status stabilisation pipe 88 of valve 69c being discharged, valve 69c opens and the third module returns to reducer operation. This status will be maintained as long as the engine's speed of rotation is below 1,8000 rpm since the opening of valve 69c has recharged pipe 88.

A similar process can enable passage from the 3rd to the 2nd ratio thanks to individual valve 69b.

Figure 9:
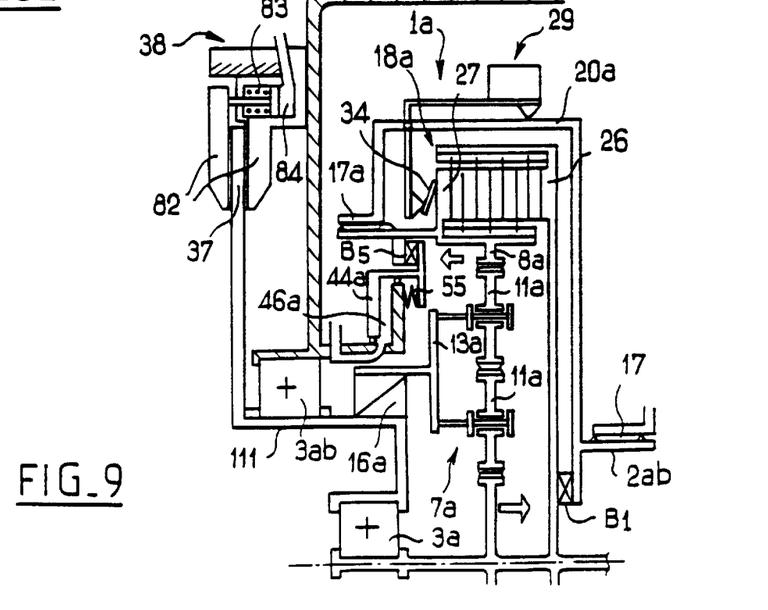
FIG. 9 corresponds to the top left-hand part of FIG. 1, but in the case of a second form of embodiment.

In the example shown in FIG. 9 which will be described only as regards its differences as compared to that shown in FIG. 2, brake 38 is no longer a hydraulic pump but a disc brake. The brake's impeller 37 is a disc integral with hub 111. Dics 37 co-operates with callipers 82 fixed to housing 4, thus prevented from turning around centre line 12. A spring 83 tends permanently to grip callipers 82 and thus immobilise hub 111. In this case free wheel 16a enables planet gear carrier 13a to turn only in the normal direction. An hydraulic jack 84 may be supplied to move the callipers apart in opposition to the force exerted by the spring. In this case, planet gear carrier 13a may turn in the opposite direction driving hub 111 with it by means of free wheel 16a, so as to achieve the neutral condition.

In order gradually to set the vehicle in motion, the pressure in jack 84 is gradually released.

Starter brake 38 is mounted externally, at the free end (opposite engine 5) of housing 4, so that if necessary the friction linings of callipers 82 may be changed in a very simple maintenance operation.

This arrangement is made possible, in the example, by the fact that the first module 1a has been moved to the free end of housing 4 instead of being at the engine end, and also to the fact that output shaft 2ab of the first module 1a is connected to crown wheel 8a of its epicyclic train. In fact it will be seen that if crown wheel 8a had been connected to input shaft 2a of module 1a (as is the case in modules 1b and 1c), there would have been on the epicyclic train 71 side opposite engine 5, a radial flange connecting shaft 2a and crown wheel 8a, and this flange would have prevented, from this side of the epicyclic train, any direct connection between the planet gear carrier and the outside of the housing. This particular arrangement of epicyclic train 7a in the first module 1a therefore has the dual advantage of enabling better stepping down between the 1st and 2nd transmission ratios, as described above, and of enabling starter device 38 to be positioned on the outside of housing 4. Clearly bearings 3a and 3ab are suitably sealed.

Figure 10:
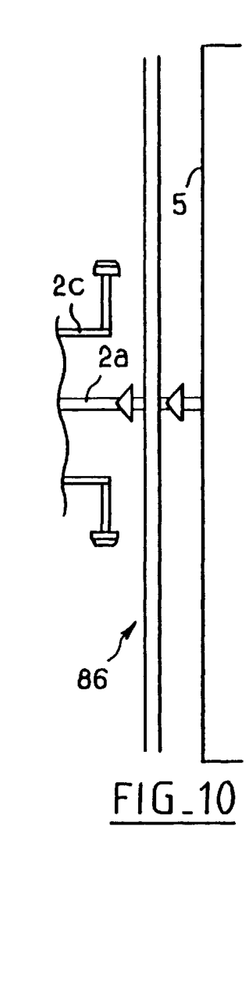
FIG. 10 corresponds to the right-hand part of FIG. 1, but in the case of a third form of embodiment.

According to another example, as shown in FIG. 10, it would also be possible to have a conventional clutch 86 between the output shaft of engine 5 and transmission input shaft 2a. In this case, brake 38 has been done away with and hub 111 is connected permanently to housing 4.

Clearly, the invention is not limited to the examples described and illustrated.

The forces applied to correct the automatic operation of the modules may be of a nature other than hydraulic, for example elastic.

The transmission system need not necessarily be arranged in successive modules.

I claim:

1. A transmission device comprising:
   a combination of rotating elements carrying intermeshing gears (7),
   a selective connection means (18a, 18b), the combination of rotating elements creating two different transmission ratios depending on whether a connection state of the selective connection means is a connected state or a disconnected state, respectively; said selective connection means being responsive to a resultant force applied thereto for adopting said connected or disconnected state, respectively;
   a free-wheel (16) mounted for selectively activating one of said rotating elements (9) when the selective connection means is in the disconnected state;
   a first force generating means (29, 34) for applying to the selective connection means, in a first direction, a first force component of said resultant force;
   a second force generating means and a selectively energizable third force generating means for applying to the selective connection means, in a second direction opposed to the first direction, a second force component and a third force component, respectively, of said resultant force; and
   an activation means which, when said third force generating means is energized and simultaneously said resultant force is in said second direction, subjects, independently of the free-wheel, said one rotating element to an activation state corresponding to one of said transmission ratios which is promoted by said second direction of force.

2. A transmission device according to claim 1, wherein one of said first and second force generating means comprise centrifugal fly-weights (29) which stress the selective connection means towards the connected state.

3. A method for controlling a transmission device according to claim 2, wherein said third force generating means are energized so that they apply to the selective connection means (44, 47) a force which exceeds that of the centrifugal fly-weights (29) only if the force of the fly-weights corresponds to a speed making it possible to shift to a lower one of the two transmission ratios without the risk of overspeed at the device's input (2a).

4. A transmission device according to claim 1, wherein one of said first and second force generating means comprise means for transmitting to the selective connection means, in the direction of disconnection, a force which depends on the torque transmitted.

5. A transmission device according to claim 1, wherein one of said first and second force generating means comprise means for transmitting to the selective connection means, in the direction of disconnection, a repulsive tooth force to which one of the intermeshed gears is subjected when it is under load.

6. A transmission device according to claim 5, wherein the selective connection means is mounted so as to transmit power instead of the said gear when it is in the connected state, so that the said gear is at least partly unloaded when the connection means is in the connected state.

7. A transmission device according to claim 1, wherein the combination of rotating elements having intermeshed gears comprises a differential set of gears and the selective connection means is a clutch (18b) mounted operatively between two of the rotating elements (8, 13) to cause the differential gear to operate selectively according to a first and a second of said two transmission ratios, the rotating element (9) associated with the free wheel (16) being a reaction rotating element that the free wheel (16) prevents from rotating in reverse when the clutch (18b) allows relative rotation between said two rotating elements (13, 8).

8. A transmission device according to claim 7 wherein said activation means is a means of immobilization (43) selectively to lock the rotating reaction element (9) independently of the free wheel (16), and the third force generating means comprises actuator means (44, 46b, 46c) for transmitting said third force to the selective connection means in said second direction being a direction of release of the clutch, and for actuating the means of immobilization (43) in a direction of locking upon displacement of the actuator means in the direction of release of the clutch (18b).

9. A transmission device according to claim 8, wherein the mean, of immobilization comprise a brake (43) mounted operatively in parallel with said free wheel (16).

10. A transmission device according to claim 8 wherein the actuator means comprise a jack (44, 46b, 46c).

11. A transmission device according to claim 10, wherein a piston (44) of the jack directly actuates the means of immobilization (43) and stresses said clutch (18b) in said direction of release via an axial thrust bearing (B4).

12. A transmission device according to claim 1, comprising means (69a, 69b, 69c) for controlling energization of said third force generating means when a speed of rotation falls below a set threshold, and means (66, 71, 71b, 71c) selectively to control the said energization independently of the set threshold.

13. A transmission device according to claim 12, wherein the said speed of rotation is detected by a tachometric pump (57) located upstream of the input shaft of the transmission device.

14. A transmission device according to claim 12, wherein the means for selectively controlling energization of said third force generating means independently of said set threshold comprise manually-controlled means (71, 71b, 71c) modifying the tension of a spring (72, 72b, 72c) counteracting a pressure which is characteristic of the said speed of rotation.

15. A transmission according to claim 1, wherein one of said first and second force generating means comprise resilient means (34) for stressing the selective connection means towards the connected state.

16. A method for controlling a transmission device according to claim 15, wherein in order to start motion of an output shaft (2c) of the device, the third force generating means are energized to place the selective connection means in the disconnected state against the action of the resilient means (34) so that motion begins on a lower one of said two different transmission ratios.

17. A method according to claim 16, wherein for operation in neutral, said third force generating means are energized thereby to establish the disconnected state in the selective connection means, and simultaneously an input clutch (38) is activated to enable rotation of an input shaft (2a) of the transmission device while the output shaft (2c) of the transmission device has zero speed.

18. A method for controlling a transmission device according to claim 1, wherein when the torque applied to an input shaft (2a) of the device is in the opposite direction to the direction of rotation of said shaft, said third force generating means are selectively energized to make the combination of gears operate on a lower one of said two different transmission ratios.

19. A method according to claim 18, wherein said third force generating means are energized when the brakes of a vehicle equipped with the transmission device are applied.

20. A method for controlling a transmission device according to claim 1, wherein said third force generating means are energized when there is a strong demand for power by the vehicle's driver.

21. A method according to claim 20, for controlling a transmission device comprising means for stabilizing each connection state of the selective connection mean by altering the conditions of change of state after each change of state, wherein said third force generating means are energized by surges when a strong demand for power is detected.

22. A transmission device according to claims 1, wherein said activation means are mechanically connected to said selectively energizable third force generating means.

23. A transmission device according to claim 1, wherein said one transmission ratio which is promoted by the second direction of force is a lower one of said two different transmission ratios of the transmission device.

* * * * *